April 6, 1965     O. M. BAYCURA     3,177,403
CROSS-FIELD CIRCUIT BREAKER FOR DIRECT CURRENT SYSTEMS
Filed June 16, 1961
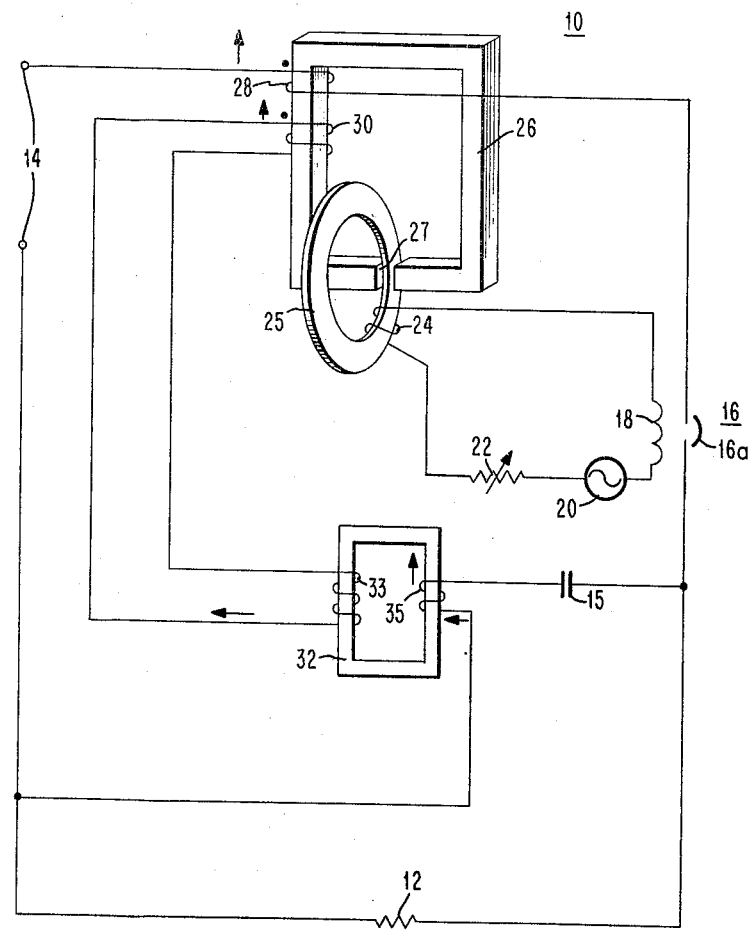
INVENTOR
ORESTES M. BAYCURA
BY Francis V. Giolma
ATTORNEY

# United States Patent Office 3,177,403
Patented Apr. 6, 1965

3,177,403
CROSS-FIELD CIRCUIT BREAKER FOR DIRECT CURRENT SYSTEMS
Orestes M. Baycura, Vestal, N.Y., assignor to International Business Machines Corporation, New York, N.Y., a corporation of New York
Filed June 16, 1961, Ser. No. 117,579
5 Claims. (Cl. 317—49)

This invention relates generally to protective devices and it has reference in particular to a cross-field controlled circuit breaker.

Generally stated, it is an object of the present invention to provide a circuit breaker system that is simple and effective over a wide range of operating conditions.

More specifically, it is an object of this invention to provide a direct current circuit breaker that is responsive to operating transient conditions, but is unaffected by initial transient conditions which may occur when the load is first connected to the source.

It is an object of this invention to provide for controlling the operation of an alternating current operated circuit breaker by means of a cross-field control device in accordance with circuit conditions in a direct current load circuit.

Yet another object of this invention is to utilize a current responsive control device in conjunction with a load circuit energy storage device for controlling a circuit breaker.

It is also an object of the present invention to utilize a current-responsive magnetic control device in conjunction with a load circuit filter capacitor charging and discharging circuit for controlling the operation of a circuit breaker connecting the load circuit to a direct current source including the filter capacitor.

Yet another object of this invention is to provide a static device control circuit for selectively controlling the operation of a circuit breaker in a direct current circuit in response to a transient circuit condition after the load is connected to the source.

The foregoing and other objects, features and advantages of the invention will be apparent from the more following particular description of a preferred embodiment of the invention, as illustrated in the accompanying drawing.

In the drawing:

The single figure of the drawing is a schematic diagram of a cross-field controlled circuit breaker embodying the invention in one of its forms.

Referring to the drawing, the reference numeral 10 denotes generally a cross-field controlled circuit breaker for connecting a load circuit represented by the load resistor 12 to a direct current source represented by the terminals 14, which may be the terminals of a rectified alternating current source provided with filter means represented by the capacitor 15 which is connected in shunt with the source between the source and the load circuit 12. A circuit breaker 16 is connected between the source and the load circuit 12 and is provided with an operating winding 18 for operating the circuit breaker contact device 16a to disconnect the load circuit from the source. The circuit breaker 16 may be of any one of a number of suitable types well known in the art.

The operating winding 18 of the circuit breaker 16 may be connected to an alternating current energizing source 20 in circuit with an adjustable impedance device 22 and a winding 24 positioned on a magnetic core control device 25. The impedance device 22 may be adjusted so that the inductance of the winding 24 is sufficient to normally limit the alternating current through the operating winding 18 to a value below that required to operate the circuit breaker 16.

The impedance of the winding 24 may be controlled by utilizing a cross-field control flux from a substantially rectangular core control magnet 26 having an air gap 27 in which the core 25 is positioned so it can be subjected to a cross-field magnetic flux produced in the gap 27 of core 26, and which flux is orthogonal to magnetic flux produced in the core 25 by winding 24. For this purpose the core 26 is provided with a winding 28 connected in series with the source 14 and the load 12 so as to produce a magnetic flux in accordance with the current supplied to the capacitor 15 and load circuit 12, and an additional control winding 30.

Provision is made to provide for selectively controlling the energization of winding 30 so as to render the operating winding 18 of circuit breaker 16 energized in response to an overload condition after the load circuit 12 has been connected to the source and yet prevent operation of the circuit breaker from the initial inrush of capacitor charging current when the load (circuit) is initially connected to the source. For this purpose the control winding 30 may be connected to be energized by means of a transformer 32 having a magnetic core with a winding 33 thereon connected in series with the control winding 30 and an additional winding 35 which is connected in series with the filter capacitor 15 of the rectified A.C. source 14.

When the load 12 is initially connected to the source 14 by closing the circuit breaker 16, the capacitor 15 will commence to charge and the charging current passes through winding 28 of magnet 26 as well as the winding 35 of the transformer 32. The winding 33 of transformer 32 is so connected to the control winding 30 of the core 26 that the magnetomotive force of winding 30 is in opposition to that of the winding 28 under these conditions so that the fluxes produced in the core of magnet 26 by the charging current of capacitor 15 cancel. Hence the core of magnet 26 does not produce any cross-field effect in the core 25 and the inductance of the winding 24 remains at a relatively high value so that current through the operating winding 18 of circuit breaker 16 from the alternating current source 20 is held to a minimum value below that required to operate the breaker. Hence the circuit breaker 16 is not tripped.

During operation, after the load circuit 12 has been initially connected to the source 14 through the circuit breaker 16, the occurrence of an overload or a short circuit in the load circuit 12 causes an increase in current through the winding 28 from the source to produce a flux in the core of magnet 26. At the same time the capacitor 15 tends to discharge through the short circuited load circuit 12. The discharge current is in a direction to produce a current in winding 35 and hence in winding 33 which energizes the control winding 30 on the core of magnet 26 in a direction which is additive relative to the winding 28. The fluxes produced by the windings 28 and 30 are therefore cumulative and add so as to produce a relatively strong air gap flux which passes through the core 25 and is orthogonal to the flux produced in the core 25 by the winding 24 and therefore reduces the inductance of the winding 24. The source 20 is therefore enabled to circulate a current of sufficient value through the operating winding 18 to trip the circuit breaker 16.

In one embodiment of the invention the core of magnet 26 is approximately 3 by 4 inches with a ¼ inch cross section, has an air gap of ¼ inch just sufficient to receive the core 25 and the windings 28 and 30 comprise approximately 10 turns each of number 20 magnet wire. The transformer 32 is made of ordinary silicon transformer iron approximately 2 inches by 4 inches x ¾ inch square cross section, windings 33 and 35 having a 1:1 ratio of turns. The ferrite core 25 has approximately 1 inch outside diameter and ¾ inch inside diameter, being wound of ¼ inch wide molybdenum permalloy tape 2 mils thick. The capacitor 15 has approximately 20,000 microfarads capacity.

From the above description and the accompanying drawing, it will be apparent that a simple and effective circuit breaker control system is provided which is sensitive and readily effective under operating conditions and yet prevents inadvertent operation of the circuit breaker when the load is first connected to the circuit even though there may be a heavy inrush current to the filter capacitors. A circuit breaker control system embodying the features of the invention is simple and inexpensive to manufacture, contains no moving parts and is extremely reliable in operation.

While the invention has been particularly shown and described with reference to a preferred embodiment thereof, it will be understood by those skilled in the art that various changes in form and details may be made therein without departing from the spirit and scope of the invention.

What is claimed is:

1. Protective means for a load circuit comprising, a circuit breaker for connecting a load circuit to a source, trip means for operating said breaker to disconnect the load circuit from the source, magnetic means having a plurality of windings for producing a cross-field control flux including one winding connected to be responsive to an increase in load current for effecting operation of said trip means, and means including an energy storage device responsive to a previous condition of the load circuit connected to another one of said windings for controlling said cross-field flux and selectively rendering the current responsive means effective and ineffective under overload and initial inrush conditions respectively for selectively operating and not operating said trip means.

2. In combination, a circuit breaker for connecting a load circuit to a source, operating means for operating the breaker to disconnect the load circuit from the source, magnetic means having a plurality of windings for producing a cross-field control flux including one winding connected in circuit with the load circuit for effecting operation of the operating means upon a predetermined increase in load current, and means including a filter capacitor connected in shunt with the load circuit and inductively coupled by another winding on said magnetic means for opposing said one winding during the initial inrush charging current of said capacitor and assisting said one winding in response to a short circuit condition of the load circuit.

3. In protective apparatus, a circuit breaker for connecting a load circuit to a source and having a trip winding energizable to open the breaker, inductance means having a magnetic core with a winding thereon connecting the trip winding to an A.C. source, a capacitor connected across the load circuit, and means for producing a cross-field control flux in said magnetic means including a magnetic core having one winding connected in circuit with the load so as to be selectively responsive to the load current and another winding connected to be energized in accordance with the capacitor current for selectively controlling the effective impedance of the winding of the inductance means in opposite senses by the charging and discharging current of the capacitor.

4. In protective apparatus, a circuit breaker disposed to connect a load circuit to a direct current source and having a trip winding energizable to open the breaker, impedance means comprising a magnetic core having a winding thereon so connecting the trip winding to an alternating current source that the current through the trip winding is normally below the operating value necessary to open the breaker, a capacitor connected across the load circuit, control means for said impedance means comprising a magnetic core having an air gap and a plurality of windings including a winding connected in series with the load circuit, said control means core being so positioned relative to the impedance means core that the air gap flux passes through the impedance means core orthogonal to the flux of the impedance means winding, and transformer means having a magnetic core with one winding connected in series with the capacitor and another winding connected to another one of the plurality of control means windings to provide a magnetic flux in said control means magnetic core which is cumulative with flux produced by the winding connected in series with the load circuit under short circuit conditions of the load circuit.

5. Protective apparatus comprising, a circuit breaker for connecting a load circuit to a direct current source and having a trip winding energizable at a predetermined level to open the circuit breaker, variable impedance means comprising a core of magnetic material with a winding thereon connecting the trip winding to an alternating current source, said winding normally having an impedance sufficient to limit the current through the trip winding to less than said predetermined level, control means including a magnetic core having an air gap disposed to accommodate a portion of the variable impedance means core and having a plurality of windings thereon including a winding connected in series with the load circuit, a capacitor connected in shunt with the load circuit, and means including a transformer having a magnetic core with one winding connected in series with the capacitor and another winding inductively related therewith connected to another one of said plurality of windings to produce a magnetic flux in said control means core cumulative with respect to the flux produced by the load current under a short circuit condition of the load circuit.

References Cited by the Examiner

UNITED STATES PATENTS

| | | | |
|---|---|---|---|
| 1,227,417 | 5/17 | Fortescue | 317—50 |
| 1,545,754 | 7/25 | Golladay | 317—50 |
| 1,671,471 | 5/28 | Fortescue | 317—50 |
| 1,761,006 | 6/30 | Butcher | 317—50 |
| 2,585,332 | 2/52 | Logan | 317—50 |
| 2,694,163 | 11/54 | Sola | 317—148 |
| 2,895,085 | 7/59 | Siedband | 317—18 |
| 3,019,373 | 1/62 | Kramer | 317—18 |

SAMUEL BERNSTEIN, *Primary Examiner.*